United States Patent Office 3,706,797
Patented Dec. 19, 1972

3,706,797
BISACYL AMINIMIDES
William J. McKillip and Lawrence M. Clemens, Minneapolis, Minn., assignors to Ashland Oil, Inc., Ashland, Ky.
No Drawing. Continuation-in-part of application Ser. No. 485,618, Sept. 7, 1965. This application Aug. 6, 1969, Ser. No. 848,066
Int. Cl. C07c 103/54
U.S. Cl. 260—558 H  7 Claims

ABSTRACT OF THE DISCLOSURE

Isocyanate precursors in the form of novel diaminimides are provided by reaction of a diacyl dichloride with an unsymmetrical hydrazine, quaternizing the resultant bisacyl hydrazide which is then titrated with a base to yield the bisacyl aminimide.

---

This application is a continuation-in-part of abandoned application Ser. No. 485,618, filed Sept. 7, 1965.

The present invention relates to novel diaminimides.

The diaminimides of the present invention have the general formula:

$$\begin{array}{c} R_1 \\ R_2-N^{\oplus}-N^{\ominus}-\overset{O}{\overset{\|}{C}}-R-\overset{O}{\overset{\|}{C}}-N^{\ominus}-N^{\oplus}-R_2 \\ R_3 \qquad\qquad\qquad\qquad\qquad R_3 \end{array}$$

wherein R is a divalent radical selected from the class consisting of aliphatic hydrocarbon radicals, cycloaliphatic hydrocarbon radicals; aromatic hydrocarbon radicals; and radicals having the formulas: —R'—O—R'—,

—R'—S—R'—

$$-R'-\overset{O}{\overset{\|}{C}}-R'-$$

and —R'—SO$_2$—R'—, wherein R' is an alkylene or arylene group; and wherein $R_1$, $R_2$ and $R_3$ are each an aryl or an alkyl radical and radicals in which $R_1$ and $R_2$ are combined to form heterocyclic rings with the nitrogen. The term aryl as employed herein is meant to define an aromatic radical in which the unsatisfied valence is at a carbon atom of the aromatic nucleus.

The diaminimides are prepared from the corresponding acid hydrazide by quaternization followed by treatment with base in accordance with the following reaction:

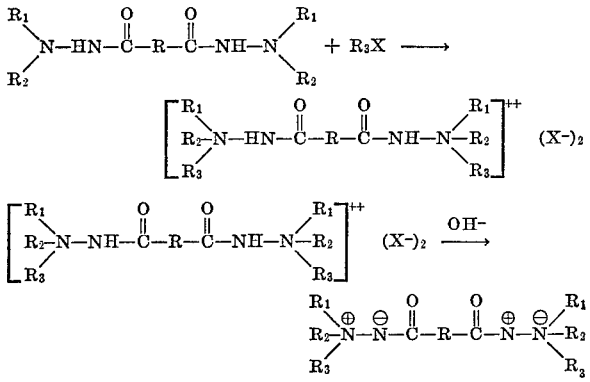

wherein R, $R_1$, $R_2$ and $R_3$ have the above-indicated meaning and X is a radical capable of forming an anion and preferably is a halogen selected from the group consisting of chlorine, bromine and iodine. Alternatively the two reactions leading to the formation of the diaminimide can be combined by reacting the acid hydrazide with $R_3X$ in the presence of a base to result directly in the formation of the diaminimide. The acid hydrazide employed in the formation of the diaminimide is obtained by the reaction of a diacid chloride with an unsymmetrical hydrazine.

The reaction of the acid hydrazide with the quaternizing agent can be conducted in the absence of a solvent if a homogeneous liquid mixture of the reagents can be formed or in the presence of a diluent which is generally a polar solvent such as acetonitrile, isopropyl alcohol, water, and dimethyl formamide. The reaction temperature can vary from room temperature to elevated temperatures which do not cause decomposition of the reagents or products. Generally the reaction is carried out at reflux temperatures for liquid reagents and at temperatures of 60° to 300° C. for reagents which require pressurization to prevent vaporization at the reaction temperatures. Thus, atmospheric as well as super-atmospheric pressures are employed, depending on the reagents and reaction temperatures.

The quaternized acid hydrazide is then treated with an aqueous base such as aqueous sodium hydroxide, preferably, to obtain a neutral pH. The reaction mixture is evaporated and the diaminimide is extracted with a suitable solvent which does not cause appreciable solution of the by-product of the cation of the base with the anion of the quaternary salt.

Various methods can be employed to purify the resulting diaminimide, such as extraction followed by crystallization or precipitation, evaporation, and chromatographic separation.

The reaction of the diacid dichloride with the unsymmetrical hydrazine is exothermic in nature and is therefore preferably carried out in the presence of a solvent and with the use of reaction cooling means. Suitable solvents include hydrocarbons, esters, and ethers. The reaction temperature is generally maintained below about 15° C., at least during the initial mixing of the reagents. An excess of the hydrazine is employed in order to assure reaction with both acid groups.

Diacid dichlorides which can be employed to form acid hydrazides and then reacted to form diaminimides have the general formula R(COCl)$_2$ wherein R has the above identified meaning and preferably is a divalent hydrocarbon radical. Specific diacid dichlorides include the dichlorides of malonic acid, succinic acid, alkyl-substituted succinic acids, phenyl-substituted succinic acid, glutaric acid, adipic acid, pimelic acid, suberic acid, sebacic acid, brassylic acid, phenyl glutaric acid, maleic acid, itaconic acid, vinyl adipic acid, dimers and trimers of linolenic acid, linoleic acid, oleic acid and mixtures thereof, isophthalic acid, naphthalic acid, nadic acid, 1,2-cyclobutane dicarboxylic acid, 1,4-cyclohexane dicarboxylic acid, dimethylene sulfone dicarboxylic acid, diphenylene sulfone dicarboxylic acid, diethylene ether dicarboxylic acid, dimethylene thioether dicarboxylic acid, and benzophenone dicarboxylic acid.

The unsymmetrical hydrazine employed in combination with the diacid dichlorides to form acid hydrazides which in turn are reacted to form diaminimides have the general formula $$H_2N-N\begin{matrix}R_1\\R_2\end{matrix}$$

wherein $R_1$ and $R_2$ have the above-indicated meaning. Preferably $R_1$ and $R_2$ are $C_1$-$C_6$ alkyl groups, phenyl and substituted-phenyl groups and such heterocyclic ring compounds as pyrrolidine, pyrrole, pyrroline, and piperidine. Specific examples of the unsymmetrical hydrazines employed to form the acid hydrazides include dimethyl hydrazine, diethyl hydrazine, methyl-ethyl hydrazine, dibutyl hydrazine, N-amino-pyrrolidine, N-amino-2-methylpyrrolidine, N-amino-2-phenylpyrrolidine, N-aminopyrrole, N-amino-2,5-dimethylpyrrole, N-amino-pyrroline, N-amino-2-phenylpyrroline, diphenyl hydrazine, dicresyl hydrazine, di-p-nitrophenyl hydrazine, and methyl-phenyl hydrazine.

The quaternizing agent employed in the formation of the quaternary salt has the general formula $R_3X$ wherein $R_3$ is an alkyl or an aryl radical and preferably is a $C_1$-$C_6$ alkyl radical or a phenyl radical. X can be any quaternizing anion but preferably is chlorine, bromine, or iodine. Nonhalogen radicals capable of forming the anion of the quaternary salt include methyl sulfonate, ethyl sulfonate, toluene sulfonate, benzene sulfonate, and similar monovalent acid radicals. Suitable quaternizing agents therefore include methyl chloride, ethyl chloride, methyl iodide, isopropyl chloride, ethyl bromine, dodecyl chloride, phenyl chloride, p-nitrophenyl chloride, cresyl iodide, phenyl methyl sulfonate, methyl toluene sulfonate and ethyl toluene sulfonate.

Exemplary of the novel diaminimides which can be formed by the above-described reagents and reactions include bis-trimethylamine malonimide, bis-triethylamine malonimide, bis-trimethylamine adipimide, bis-tributylamine adipimide, bis-triphenylamine adipimide, bis-dimethylphenylamine adipimide, bis-dimethylethylamine adipimide, bis-N-methyl-pyrrolidine adipimide, bis-N-ethyl-2-phenylpyrrolidine adipimide, bis-N-methyl-2-methylpyrrolidine adipimide, bis-N-methylpyrrole adipimide, bis-N-phenylpyrrole adipimide, bis-methyldiphenylamine pimelimide, bis-triphenylamine azelaimide, bis-trimethylamine azelaimide, bis-triethylamine azelaimide, bis-trihexylamine azelaimide, bis-trimethylamine sebacimide, bis-di-p-nitrophenylmethylamine sebacimide, bis-methyldicresylamine sebacimide, bis-dimethylphenylamine sebacimide, bis-trimethylamine dodecane-1,12-dicarboximide, bis-trimethylamine terephthalimide, bis-triethylamine terephthalimide, bis-tributylamine terephthalimide, bis-trihexylamine terephthalimide, bis-triphenylamine terephthalimide, bis-dimethylphenylamine terephthalimide, bis-diphenylmethylamine terephthalimide, bis-N-methylpyrrole terephthalimide, bis-N-ethylpyrroline terephthalimide, bis-N-phenylpyrroline terephthalimide, bis-N-methylpyrrolidine terephthalimide, bis-N-methyl-2-phenylpyrrolidine terephthalimide, bis-trimethylamine toluene-2,4-dicarboximide, bis-trimethylamine toluene-3,5-dicarboximide, bis-triphenylamine phthalimide, bis-trimethylamine phthalimide, bis-trimethylamine isophthalimide, bis-triethylamine ethylbenzene-2,4-dicarboximide, bis-trimethylamine n-butylbenzene-2,6-dicarboximide, and bis-trimethylamine naphthalene-1,5-dicarboximide.

The preferred diaminimides have the general formulas

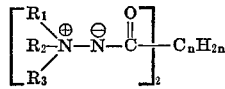

and

wherein $n$ is an integer of 1 to 12, $R_1$, $R_2$ and $R_3$ are $C_1$-$C_6$ alkyl groups and Y is either a hydrogen or a $C_1$-$C_6$ alkyl group.

The diaminimides of the present invention are particularly useful for conversion to the corresponding diisocyanates which are, of course, well known as monomers in the formation of polyurethanes, polyureas or as treating agents for free-hydrogen containing substrates such as wool, cotton, etc. Such conversion can be accomplished by heating the diaminimide to temperatures above about 150° C., to effect a rearrangement resulting in the formation of the diisocyanate and a tertiary amine, as illustrated by the following equation

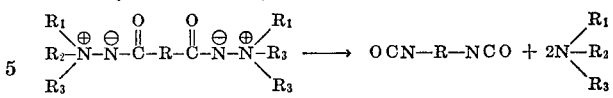

wherein R, $R_1$, $R_2$ and $R_3$ have the above-indicated meaning.

The formation of the diaminimides is further illustrated by the following examples in which all units of quantity are by weight unless otherwise stated.

EXAMPLE I

Into a round bottom flask equipped with a mechanical stirrer and addition funnel is dissolved 99.2 g. of sebacyl chloride in 150 ml. of hexane. The solution is externally cooled to maintain a temperature below 15° C. and 117 g. of 1,1-dimethyl hydrazine are added slowly with agitation over a period of one hour. After addition of the dimethyl hydrazine, the solution is stirred for an additional 12 to 16 hrs. at room temperature. The resulting reaction mixture is filtered and the solids thus obtained are dissolved in about 800 ml. of water and treated with 33.2 g. of sodium hydroxide dissolved in 300 ml. of water. The resulting solution is stripped of volatiles at 60° C. and at 10 to 20 mm. Hg pressure. The residue is extracted successively with 800, 400, and 200 ml. portions of acetone. Evaporation of the acetone results in 91.2 g. of bis-N,N-dimethylsebacyl hydrazide, representing a 74% yield.

*Analysis.*—Calcd. for $C_{14}H_{24}N_4O_2$ (percent): C, 58.71; H, 10.56; N, 19.56. Found (percent): C, 57.86; H, 10.27; N, 19.13.

In a 2 liter Parr reactor, 111 g. of bis-N,N-dimethylsebacyl hydrazide are partly dissolved in a solution consisting of 237 g. of isopropyl alcohol, 100 g. of water and 2 g. of sodium bicarbonate. The stirred mixture is heated to 200° to 220° F. and the total pressure is adjusted to about 70 p.s.i. by addition of methyl chloride gas. The pressure is maintained until no further methyl chloride is taken up by the reaction mixture. The reactor is cooled and the solid product is collected. The remaining liquid is evaporated to dryness. The residue is combined with the initially obtained solid and recrystallized from ethanol. A total of 108 g., 72% yield, of the quaternary salt having the formula

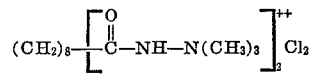

is obtained.

The quaternary salt, 42.7 g., is dissolved in 100 ml. of water and treated with 91 ml. of 2.1 N aqueous sodium hydroxide. The solution is evaporated to dryness and the residue pulverized and extracted with boiling acetone. The acetone is evaporated and the solid residue recrystallized from acetone. A 78% yield of bis-trimethylamine sebacimide is obtained.

*Analysis.*—Calcd. for $C_{11}H_{34}N_4O_2$ (percent): C, 61.11; H, 10.90; N, 17.82. Found (percent): C, 60.68; H, 10.70; N, 17.18.

A portion of the imide is heated to 160° C. and results in a 60% yield of 1,8-octane-diisocyanate.

EXAMPLE II

Employing the procedure of Example I, azelayl dichloride is reacted with 1,1-dimethyl hydrazine to form bis-N,N-dimethylazelayl hydrazide, except that the resulting product is extracted with benzene and tetrahydrofuran.

A solution consisting of 13.8 g. of the azelayl hydrazide and 27 g. of methyl iodide is refluxed for 24 hrs. Removal of all but a trace of solvent gives a residue of 27.6 g. of the crude product. Recrystallization of the product from a methanol-ether mixture gives a first crop of 21.3 g., a 23% yield, of bis-1,1,1-trimethyl-2-azelayl-hydrazonium iodide.

*Analysis.*—Calcd. for $C_{15}H_{34}N_4O_2I_2$ (percent): C, 32.89; H, 6.16; N, 10.07. Found (percent): C, 32.66; H, 6.00; N, 9.65.

The hydrazonium iodide, 60 g., is dissolved in 60 ml. of water and treated with 110 ml. of 1.60 N aqueous sodium hydroxide. The solution is then evaporated to dryness. The residue is extracted with an acetone-ether mixture and on stripping of the solvent, bis-trimethylamine azelaimide is obtained, M.P. 146 to 147.5° C.

*Analysis.*—Calcd. for $C_{15}H_{32}N_4O_2$ (percent): C, 59.96; H, 10.74; N, 18.65. Found (percent): C, 60.18; H, 10.36; 18.43.

Pyrolysis of the diaminimide results in the formation of trimethylamine and 1,7-heptane-diisocyanate.

EXAMPLE III

A mixture of 10.5 g. of bis-1,1-dimethyl-2-azelayl hydrazide and 23.5 g. of methyl p-toluene sulfonate in 200 ml. of benzene-ethanol is refluxed for 16 hrs. The product is collected by filtration, washed with benzene, dried and recrystallized from methanol-acetone. The product obtained is bis-1,1,1-trimethyl-2-azelayl-hydrazonium p-toluene sulfonate. The quaternary salt, when treated with sodium hydroxide as described in Example I, results in bi-trimethylamine azelaimide.

EXAMPLE IV

Following the procedure of Example I, adipyl dichloride is reacted with 1,1-dimethylhydrazine and bis-N,N-dimethyladipyl hydrazide is obtained.

A solution consisting of 13.8 g. of the adipyl hydrazide and 27 g. of methyl iodide is refluxed for 24 hrs. The solvent is removed and the residue recrystallized from methanol to give a 91% yield of bis-1,1,1-trimethyl-2-adipyl-hydrazonium iodide.

*Analysis.*—Calcd. for $C_{12}H_{26}N_4O_2I_2$ (percent): C, 51.80; H, 7.02; N, 9.30. Found (percent): C, 51.66; H, 6.99; N, 8.59.

Employing the procedure of Example III, the quaternary salt is produced from the adipyl hydrazide and methyl p-toluene sulfonate. The treatment of the quaternary salt with sodium hydroxide following the procedure of Example I results in the formation of bis-trimethylamine adipimide.

EXAMPLE V

Following the procedure of Example I, maleic acid dichloride is reacted with 1,1-dimethylhydrazine and bis-N,N-dimethylmaleyl hydrazide is obtained.

Following the procedure of Example III and Example I, the bis-N,N-dimethylmaleylhydrazide is reacted with methyl p-toluene sulfonate and the quaternary ammonium salt is reacted with aqueous sodium hydroxide to form bis-trimethylamine maleimide which is isolated.

EXAMPLE VI

Following the procedure of Example I, cyclobutane-1, 2-dicarboxyl dichloride is reacted with 1,1-dimethylhydrazine. A greater than 60% yield of bis-N,N-dimethyl cyclobutane-1,2-dicarboxyl hydrazide is obtained.

*Analysis.*—Calcd. for $C_{10}H_{20}N_4O_2$ (percent): C, 52.61; H, 8.83; N, 24.54. Found (percent): C, 51.89 H, 8.58; N, 23.68.

The bis-N,N-dimethylcyclobutae-1,2-dicarboxylic hydrazide is reacted with methyl iodide as set forth in Example II employing methyl cyanide as a solvent. The product is recrystallized from methanol and the hydrazonium salt having the formula $$\begin{array}{c} \text{O} \\ \| \\ \text{CH}_2\text{—CH—C—NH—}\overset{\oplus}{\text{N}}(\text{CH}_3)_3 \quad \text{I}^{\ominus} \\ | \\ | \quad \text{O} \\ | \quad \| \\ \text{CH}_2\text{—CH—C—NH—N}(\text{CH}_3)_3 \quad \text{I}^{\ominus} \end{array}$$

is obtained.

The hydrazonium salt is reacted with aqueous sodium hydroxide as set forth in Example I and extracted with isopropanol to give a greater than 60% yield of bis-trimethylamine cyclobutane-1,2-dicarboximide.

*Analysis.*—Calcd. for $C_{12}H_{24}N_4O_2$ (percent): C, 56.22; H, 9.44; N, 21.86. Found (percent): C, 55.65; H, 9.42; N, 21.08.

EXAMPLE VII

Following the procedure of Example I, isophthalyl dichloride is reacted with 1,1-dimethylhydrazine. The product is extracted with ethyl alcohol. A 75% yield of bis-N,N-dimethylisophthalyl hydrazide is obtained, M.P. 255–256° C.

*Analysis.*—Calcd. for $C_{12}H_{18}N_4O_2$ (percent): C, 57.58; H, 7.52; N, 22.39. Found (percent): C, 57.77; H, 7.11; N, 22.71.

Following the procedure of Example I, the isophthalyl hydrazide is reacted with methyl chloride and a 75% yield of bis-1,1,1-trimethyl-2-isophthalyl-hydrazonium chloride is obtained.

*Analysis.*—Calcd. for $C_{14}H_{21}N_4O_2Cl_2$ (percent): C, 47.87; N, 6.89; H, 15.95. Found (percent): C, 46.29; N, 7.65; H, 14.91.

Following the procedure of Example II, bis-1,1,1-trimethyl-2-isophthalylhydrazonium iodide is produced.

The isophthalyl hydrazonium iodide is reacted with aqueous sodium hydroxide and the diaminimide is extracted with a methanol-ether mixture following the procedure of Example I. An 80% yield of bis-trimethylamine isophthalimide is obtained.

To 50 parts of a commercial polyester resin having a hydroxyl number of 55 and an equivalent weight of 985 is added 7.7 parts of bis-trimethylamine isophthalylimide and 2 parts of stannous octoate (T–9). The mixture is heated to 170° C. whereupon triethylamine vaporizes from the reaction mixture. Further heating to 250° C. causes the mixture to gel. The mixture is then allowed to cool to room temperature. A tacky, tough, elastomeric polyurethane is obtained.

The foregoing examples have illustrated the formation of the novel diaminimides and their decomposition to isocyanates in the absence and in the presence of a polyhydroxy compound, the latter resulting in the formation of a polyurethane. It will be apparent that the illustrated methods are equally applicable to other diacid chlorides, unsymmetrical hydrazines and quaternizing agents included within the scope of the present invention but not specifically illustrated in the examples. Other means of preparing the intermediates such as the acid hydrazide, and the quaternary ammonium compound will be apparent to those skilled in the art.

Since many embodiments of the invention will be apparent, it is not intended to limit the invention to the specific features disclosed except as defined in the appended claims.

We claim:
1. A diaminimide having the formula

$$\begin{array}{c} R_1 \quad\quad\quad\quad O \quad\quad O \quad\quad\quad\quad R_1 \\ \diagdown\overset{\oplus}{}\;\;\ominus\;\;\| \quad\quad \| \;\;\ominus\;\;\overset{\oplus}{}\diagup \\ R_2\text{—N—N—C—R—C—N—N—}R_2 \\ \diagup \quad\quad\quad\quad\quad\quad\quad\quad\quad\quad\quad \diagdown \\ R_3 \quad\quad\quad\quad\quad\quad\quad\quad\quad\quad\quad R_3 \end{array}$$

wherein

R is a radical selected from the group consisting of
  (a) divalent aliphatic hydrocarbon
  (b) divalent saturated cycloaliphatic hydrocarbon
  (c) arylene
  (d) —R'—O—R'—
  (e) —R'—S—R'—
  (f)

$$\begin{array}{c} \text{O} \\ \| \\ \text{—R'—C—R'—} \end{array}$$

(g) —R'—SO$_2$—R'—

R' is alkylene or arylene

R$_1$, R$_2$ and R$_3$, when taken singly, represent an alkyl or aryl group

R$_1$ and R$_2$ when taken collectively with the nitrogen atom to which they are attached, represent a heterocyclic ring selected from the group consisting of pyrrolidine, pyrrole, pyrroline and piperidine.

2. A diaminimide in accordance with claim 1 wherein R is a C$_2$–C$_{34}$ alkenylene radical.

3. A diaminimide in accordance with claim 2 wherein R$_1$, R$_2$ and R$_3$ are alkyl groups having from 1–6 carbon atoms.

4. A diaminimide in accordance with claim 1 wherein R is a phenylene radical.

5. A diaminimide in accordance with claim 2 wherein R$_1$, R$_2$ and R$_3$ are alkyl groups having from 1–6 carbon atoms.

6. A diaminimide having the formula

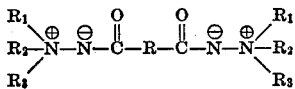

wherein

R is (a) a C$_1$–C$_{12}$ alkylene radical
(b) a C$_2$–C$_{34}$ alkenylene radical
(c) a divalent saturated C$_4$–C$_6$ cycloaliphatic hydrocarbon radical
(d) phenylene radical
(e) naphthylene radical
(f) —R'—O—R'—
(g) —R'—S—R'—
(h)

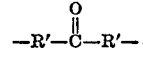

(i) —R'—SO$_2$—R'—

R' is alkylene or phenylene

R$_1$, R$_2$ and R$_3$, when taken singly, represent an alkyl or phenyl group, and, R$_1$ and R$_2$, when taken collectively with the nitrogen atom to which they are attached, represent a heterocyclic ring selected from the group consisting of pyrrolidine, pyrrole, pyrroline and piperidine.

7. A diaminimide in accordance with claim 6 wherein R$_1$, R$_2$ and R$_3$ are methyl.

References Cited

UNITED STATES PATENTS 3,410,880   11/1969   Brocklehurst _____ 260—561

HARRY I. MOATZ, Primary Examiner

U.S. Cl. X.R.

260—293.69, 293.71, 293.73, 293.77, 293.78, 293.85, 293.86, 326.3, 326.85, 453 P, 557 H, 559 H, 561 H, 562 H, 558